W. I. THOMPSON.
LIQUID HEATER.
APPLICATION FILED SEPT. 29, 1919.
1,355,867.     Patented Oct. 19, 1920.
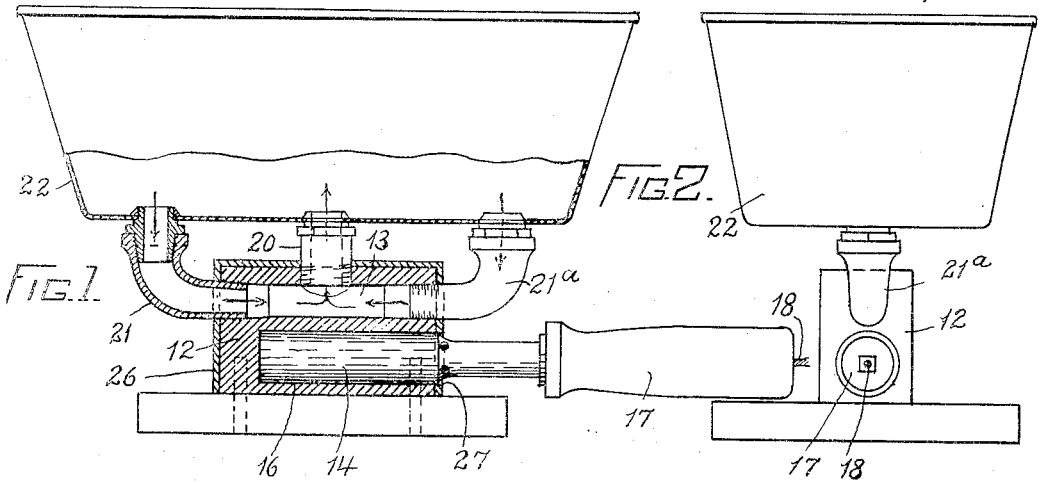
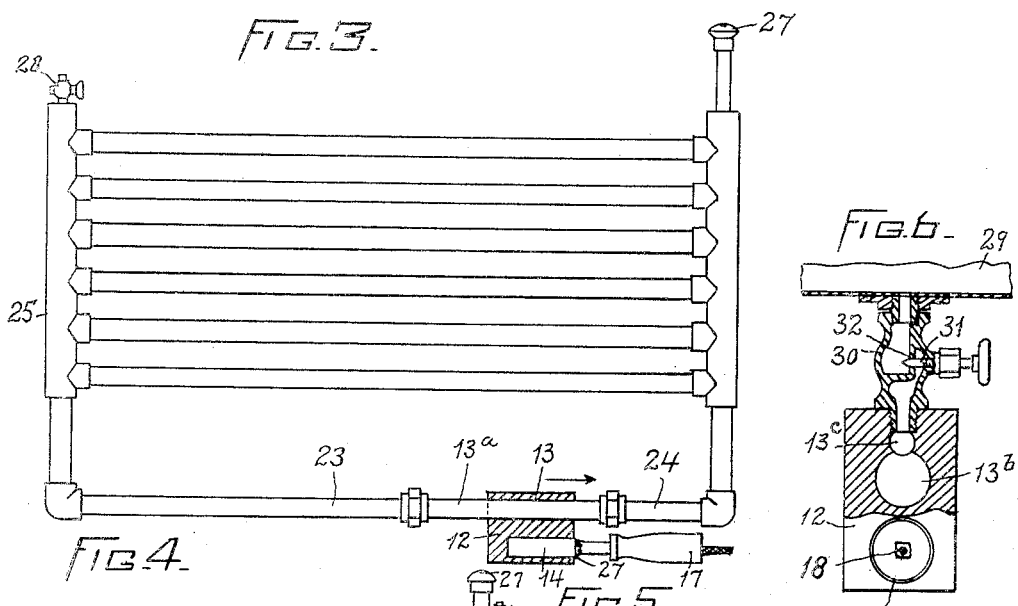
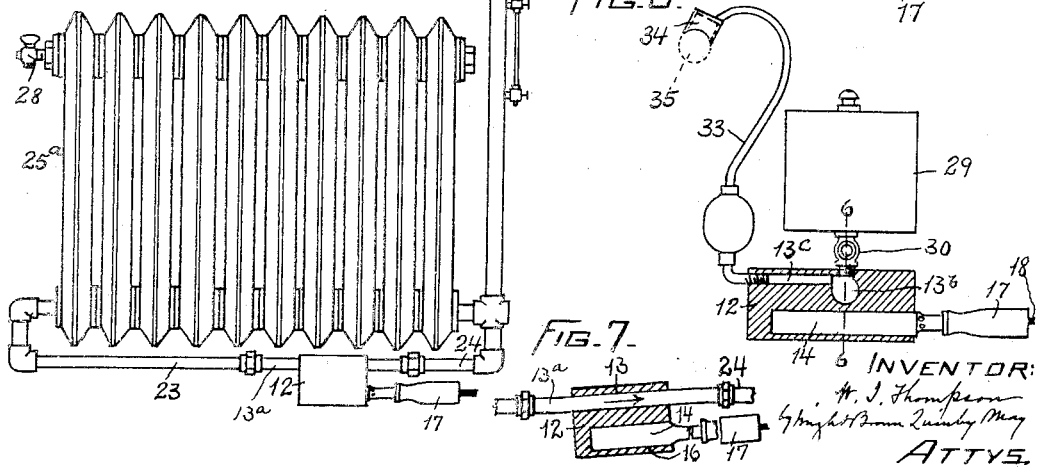
INVENTOR:
W. I. Thompson
ATTYS.

UNITED STATES PATENT OFFICE.

WILLIAM I. THOMPSON, OF STONEHAM, MASSACHUSETTS.

LIQUID-HEATER.

1,355,867.  Specification of Letters Patent.  Patented Oct. 19, 1920.

Application filed September 29, 1919. Serial No. 327,234.

*To all whom it may concern:*

Be it known that I, WILLIAM I. THOMPSON, a citizen of the United States, residing at Stoneham, in the county of Middlesex and State of Massachusetts, have invented new and useful Improvements in Liquid-Heaters, of which the following is a specification.

This invention has for its object to provide a simple and efficient heater including an electrical heating unit, and adapted to be used for various purposes, or embodied in structures capable of various uses.

The invention is embodied in the improvements which I will now proceed to describe and claim.

Of the accompanying drawings forming a part of this specification,—

Figure 1 is a partial side elevation of a partial section of a heater embodying the invention.

Fig. 2 is an end view of the same.

Fig. 3 is a side view, partly in section, showing another embodiment of the invention.

Fig. 4 is a side elevation, showing a third embodiment of the invention.

Fig. 5 is a side view, partly in section, showing a fourth embodiment of the invention.

Fig. 6 is a section on line 6—6 of Fig. 5.

Fig. 7 is a view similar to a portion of Fig. 3, showing a modification.

In the drawings, 12 represents a block or body of suitable heat conducting material, such as cast iron, 13 represents a heating chamber contained in said body, said chamber being formed as a conduit portion, and 14 represents an electrical heating unit contained in the body in close proximity to the chamber 13. The unit 14, which may be of any suitable construction, is preferably inserted removably in a socket 16, formed for its reception in the body 12, the unit being provided with an insulated handle 17, through which its conducting wires 18 extend. I do not wish to be understood, however, as limiting myself to the unit removably connected with the body 12, the removability being mainly for convenience in repairing or renewing the unit, or any component part or parts thereof.

The heating unit and the body 12 are so proportioned and organized that the body is adapted to be heated by the unit, and to heat a fluid contained in the chamber 13.

It will now be seen that the body 12, the chamber 13, and the heating unit 14, constitute a heater adapted to heat water or other fluid supplied to the chamber 13.

With said heater are combined supply and discharge conduits communicating with the chamber 13, and adapted to cause fluid to flow therethrough, means being provided for supplying fluid to the supply conduit, the fluid thus supplied being heated in its passage through the chamber, and being conducted from the chamber by the discharge conduit.

The means thus far described for maintaining the flow of fluid through the chamber 13, and for heating the fluid in transit, may be utilized for various purposes, and may be embodied in various structures, several of which are shown by the drawings.

Referring to Figs. 1 and 2, 20 represents a discharge conduit communicating with the central portion of the chamber 13, and 21 represents a supply conduit communicating with one end of the chamber. In this case, there is another supply conduit $21^a$, communicating with the opposite end of the chamber, although, if desired, the additional conduit $21^a$ may be omitted. 22 represents a receptacle formed as an open pan or tank, connected, as shown by Fig. 1, with the conduits 20, 21, and $21^a$. The receptacle 22 may contain liquid glue, or other fluid or semifluid material, to be heated, the arrangement being such that the fluid passes from the receptacle to the chamber 13 through the supply conduits 21 and $21^a$, and from the chamber to the receptacle through the discharge conduit 20.

Figs. 3 and 4 show the chamber 13 provided with a lining or bushing, formed by a short section of tubing $13^a$ inserted in the chamber 13, and adapted to conduct fluid therethrough, the bore of the section $13^a$ constituting the heating surface of the chamber, so that the said section may be considered a part of the body 12. To the ends of the section $13^a$ are connected a supply conduit 23, and a discharge conduit 24, these conduits communicating with opposite ends of a fluid receptacle formed as a heat radiator, designated as a whole by the reference numeral 25 in Fig. 3, and by the reference numeral $25^a$ in Fig. 4. The conduit 24 in this embodiment of the invention, constitutes a flow conduit, adapted to conduct heated fluid from the heater to the radiator, and the conduit 23 constitutes a return conduit adapted to conduct fluid from the radiator to the heater. A constant circulation of heated fluid is maintained through the radiator, and is utilized by the latter for heating purposes. The body 12 and its chamber 13 may be inclined to induce an outward flow through the conduit 24, as shown by Fig. 7.

The structure including a radiator as shown by Figs. 3 and 4, is adapted particularly for heating garages, and relatively small rooms, at a relatively small expense for electric current.

The body 12 is preferably incased in a heat-insulating jacket 26, which may be composed wholly or in part, of asbestos, the jacket having an opening 27 coinciding with the mouth of the socket 16, and permitting the insertion and removal of the heating unit 14. The jacket not only economizes heat, but also, in the case of a garage heater, prevents danger of ignition by the heated surface of the body 12, of a mixture of air and gasolene vapor liable to be present in the garage.

The radiator may be provided with a vent 27, which is constantly open to the atmosphere, and with the usual pet cock 28.

In each of the embodiments of the invention above described, a fluid receptacle is employed, which receives heated fluid from the heater and constitutes a means for supplying fluid through a supply conduit to the chamber 13 of the heater.

Figs. 5 and 6 show an embodiment of the invention in which an independent fluid receptacle or tank 29 supplies fluid through the supply conduit 30 to the chamber in the body 12, said chamber being composed of a larger portion 13<sup>b</sup> and a smaller portion 13<sup>c</sup>. The supply conduit 30 is provided with a needle valve 31, coöperating with a part 32 in said conduit, to regulate the flow of fluid from the receptacle 29 to the larger chamber portion 13<sup>b</sup>. The arrangement is such that water admitted to the heated chamber is converted into steam, which is conducted through a discharge conduit 33 having an open terminal or nozzle 34, adapted to bear on a water pipe 35.

This embodiment of the invention is adapted to be used for melting ice formed in a water pipe 35.

I claim:

1. A heater comprising a body of heat-conducting material having a heating chamber constituting a portion of a conduit, and an electrical heating unit contained in said body, combined with supply and discharge conduits communicating with said chamber and adapted to cause fluid to flow therethrough, means being provided for supplying fluid to said supply conduit.

2. A heater comprising a body of heat-conducting material having a heating chamber constituting a portion of a conduit, and an electrical heating unit contained in said body, combined with supply and discharge conduits communicating with said chamber and adapted to cause fluid to flow therethrough, and a fluid receptacle communicating with said supply and discharge conduits and adapted to conduct fluid from one of said conduits to the other.

3. A heater comprising a body of heat-conducting material having a heating chamber constituting a portion of a conduit, and an electrical heating unit contained in said body, combined with supply and discharge conduits communicating with said chamber and adapted to cause fluid to flow therethrough, and a radiator communicating with said supply and discharge conduits and adapted to conduct fluid from one of said conduits to the other and to utilize the fluid in transit for heat radiation.

4. A heater comprising a body of heat-conducting material having a heating chamber constituting a portion of a conduit and a socket adjacent to said chamber, and an electrical heating unit removably inserted in said socket, combined with supply and discharge conduits communicating with said chamber and adapted to cause fluid to flow therethrough, means being provided for supplying fluid to said supply conduit.

5. A heater comprising a body of heat-conducting material having a heating chamber constituting a portion of a conduit, an electrical heating unit contained in said body, and a heat-insulating jacket inclosing said body, combined with supply and discharge conduits communicating with said chamber and adapted to cause fluid to flow therethrough, means being provided for supplying fluid to said supply conduit.

6. A heater comprising a body of heat-conducting material having a heating chamber constituting a portion of a conduit, a socket adjacent to said chamber, a heat-insulating jacket inclosing said body and having an opening coinciding with the mouth of said socket, and a heating unit removably inserted in said opening and socket, combined with supply and discharge conduits communicating with said chamber and adapted to cause fluid to flow therethrough, means being provided for supplying fluid to said supply conduit.

In testimony whereof I have affixed my signature.

WILLIAM I. THOMPSON.